Patented July 20, 1926.

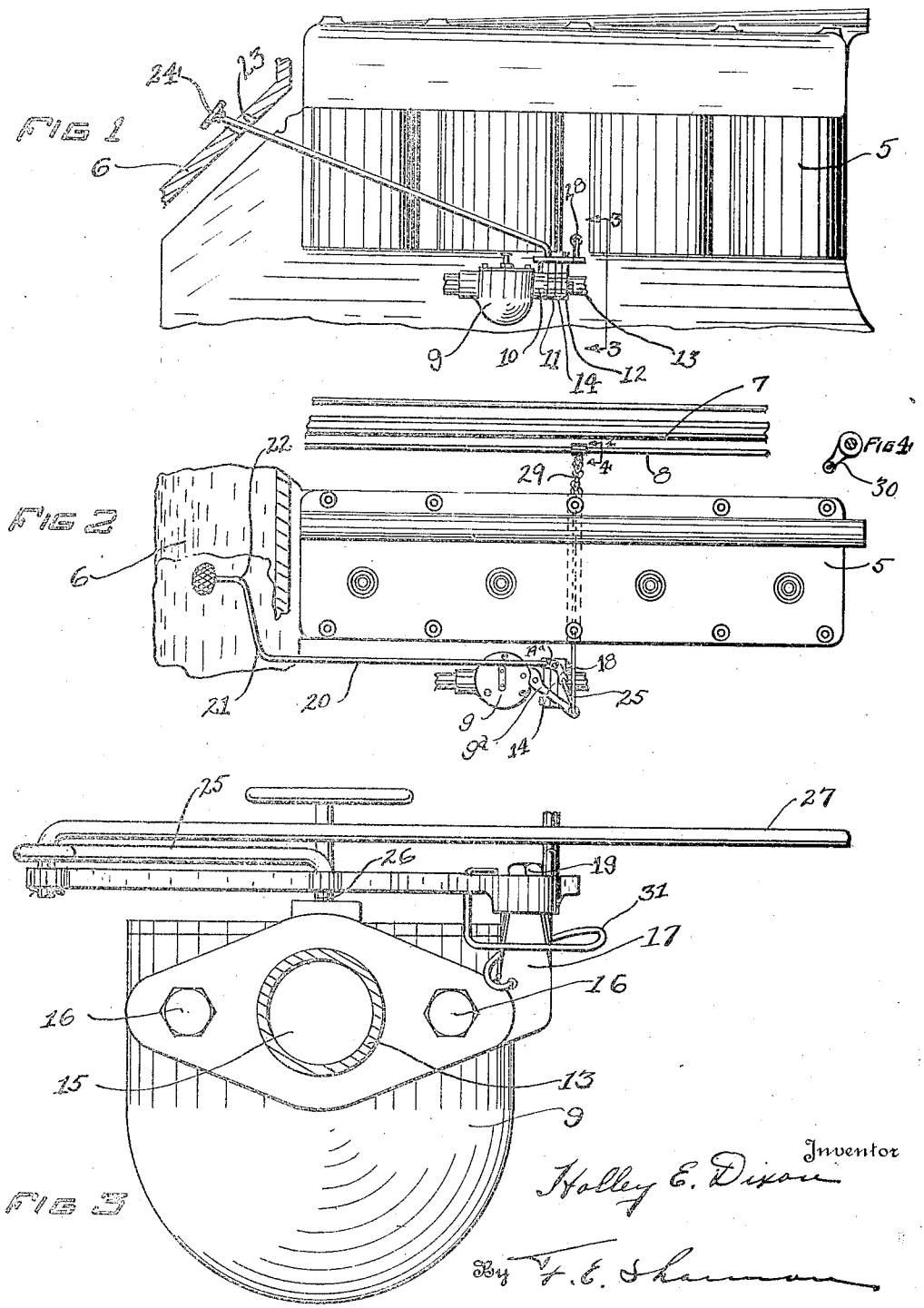

1,593,293

UNITED STATES PATENT OFFICE.

HOLLEY E. DIXON, OF AKRON, OHIO, ASSIGNOR TO THE AKRON SPECIALTY MANUFACTURING COMPANY, OF AKRON, OHIO, A CORPORATION OF OHIO.

ACCELERATOR FOR AUTOMOBILES.

Application filed August 19, 1924. Serial No. 732,990.

This invention relates to certain new and useful improvements in pedal accelerators for the engines of automobiles and like vehicles.

The device of the invention is primarily adapted for use on Ford motor vehicles and vehicles of a like type which are ordinarily equipped with a lever controlling device positioned on the steering wheel, but, the invention may be applied to advantage on motor vehicles of other types.

Objects of the invention are to provide a pedal accelerator of simple, durable construction which will be composed of few parts and which may be quickly and conveniently attached to a motor vehicle.

A further object is to provide a foot accelerator which may be manufactured at a low cost and which may be conveniently operated without interfering with the lever controlling device, and, which will be extremely efficient in use.

The above objects are accomplished and additional ends are attained by the novel construction, combination and arrangement of parts hereinafter described and illustrated in the accompanying drawing, wherein I have shown a preferred form of the invention, it being understood that the invention is capable of various adaptations and that changes and modifications may be made or substitutions resorted to which come within the scope of the appended claims.

In the drawings which form a part hereof and in which like numerals of reference denote like parts as the same appear in any of the several views and in which:—

Figure 1 is a side elevational view of an automobile engine with an accelerator constructed in accordance with this invention attached to the carbureter, a portion of the motor vehicle being shown in vertical section.

Figure 2 is a top plan view of a portion of an automobile engine with a pedal accelerator constructed in accordance with this invention with parts broken away and parts shown in section to more clearly illustrate the invention.

Figure 3 is a front elevational view taken as indicated by the lines 3—3 of Figure 1, illustrating the manner of attaching the device of this invention to a Ford carbureter; the pipe leading to the intake manifold being shown in transverse section.

Figure 4 is a sectional view taken as indicated by the lines 4—4 of Figure 2.

Proceeding now to a detailed description of the invention, the numeral 5 is used generally to denote an automobile engine, the numeral 6 denotes the floor board of the vehicle; the numeral 7 is used to denote the steering column of the vehicle and the numeral 8 the hand throttle rod which is associated with the steering column. The numeral 9 is provided with the usual outlet pipe 10 having a flange 11 by which it is ordinarily connected to a similar flange 12 on the pipe 13 leading to the intake manifold.

The numeral 14 denotes a plate which is adapted to be inserted between the flanges 11 and 12. The plate 14 is provided with a centrally positioned opening of approximately the same shape and dimensions as the opening 15 in the outlet pipe 10 and the bore of the pipe 13 leading to the intake manifold. The plate 14 is also provided with suitable bores adapted to receive the bolts 16 which are ordinarily used in securing the flange 11 to the flange 12. It will thus be seen that the plate 14 may be quickly and firmly secured in position between said flanges. The plate 14 is provided at the inner end thereof with an upstanding projection 17. The projection 17 is preferably provided with a flat, upper face on which is mounted a lever 18. The lever 18 is provided with a vertical bore and is secured to the projection 17 by means of the bolt 19 which is entered in said bore and is secured in a suitable threaded bore in the projection 17. The lever 18 is provided with a relatively short end 18$^a$ which normally projects inwardly at a rearward inclination. The end 18$^a$ is provided with a vertical bore 18$^b$. The numeral 20 denotes a rod which is provided on the forward end thereof with a downwardly turned end portion 21 which is mounted in the bore 18$^b$. The rod 20 is preferably bent as at 21 and 22 and the rearwardly projecting end thereof projects through a suitable opening 23 in the floor boards 6. The rod 20 is provided at the rearwardly projecting end thereof with a suitable foot plate 24. The other end 18$^c$ of the lever 18 projects outwardly and is provided adjacent the outwardly projecting end thereof with a vertical bore 18$^d$. The numeral 25 denotes a connecting member which is provided at each end thereof with a downturned end portion 26. One of the end turned portions is mounted with a bore 18ᵈ and the other end thereof is mounted in a suitable bore in the control lever 9ᵃ on the carbureter 9. The numeral 27 denotes a rod which is attached to the lever 9ᵃ on the carbureter 9 and which is slidably mounted in the bore 28 which extends transversely through the engine 5. The rod 27 is provided at the other end thereof with a chain 29 which is operatively attached to a lever 30 on the rod 8.

It will thus be seen that the rod 20 is pivotally secured to one end of the lever 18 and that the connecting member 25 is pivotally secured to the other end of the lever 18 and the lever 9ᵃ. The numeral 31 denotes a spring which is secured in a suitable bore in the base of the extension 17 and which extends spirally around the projection with the other end thereof secured in a suitable bore in the end 18ᶜ of the arm 18. The spring 31 is designed to normally hold the rod 20 in an upward position and the lever 9ᶜ in a position where it will feed a minimum amount of explosive mixture to the intake manifold.

It will thus be seen that an application of foot pressure to the plate 24 will swing the lever 18 causing an inward movement of the control lever 9ᵃ thereby opening the valve in the carbureter 9 and accelerating the speed of the engine.

It will also be seen that the operation of the lever 9ᵃ by means of the rod 20 will not cause a movement of the hand throttle rod 8, inasmuch as the chain will sag downwardly with an inward movement of the rod 27.

Having thus illustrated my invention and described the same in detail, what I claim as new and desire to secure by Letters Patent is:—

1. In a motor vehicle, in combination, a carbureter, a tube leading from the carbureter to the intake manifold, a flanged joint in said tube, a plate secured between the flange of said joint, said plate having an opening coinciding with the bore of said tube, an arm projecting upwardly from one end of said plate, a lever pivotally fulcrumed on said arm, a rod pivotally secured to one end of said arm, said rod projecting through the floor board of the vehicle and provided on the free end thereof with a pedal head, a link pivotally connected to the other end of said lever, the other end of said link being pivotally connected to the control lever of said carburetor.

2. In a motor vehicle, in combination, a carburetor, a tube leading therefrom to the intake manifold, a flanged joint in said tube, a supporting manifold secured between the flange of said joint, said supporting member having an opening arranged to leave an unobstructed passage from the carburetor to said manifold, an arm projecting upwardly from one end of said supporting member, a lever pivotally fulcrumed on said arm, a rod pivotally secured to one end of said arm, said rod projecting through the floor board of the vehicle and provided on the free end thereof with a pedal head, a rigid link pivotally connected to the other end of said lever, the other end of said link being pivotally connected to the control lever of said carburetor and means operatively connecting said lever to a hand throttle.

3. In a motor vehicle of the class described, in combination, a carburetor, a tube leading from the carburetor to the intake manifold, a flanged joint in said tube, a plate secured between the flange of said joint, a centrally positioned opening in said plate, an arm projecting upwardly from one end of said plate, a lever pivotally fulcrumed on said arm, a rod pivotally secured to one end of said arm, said rod projecting through the floor board of the vehicle and provided on the free end thereof with a pedal head, a rigid link pivotally connected to the other end of said lever and pivotally connected to the control lever of said carburetor, a hand throttle associated with the steering column of the vehicle, a rod connected to the control lever of the carburetor and flexible means operatively connecting the hand throttle to said rod.

In testimony whereof I have hereunto set my hand.

HOLLEY E. DIXON.